June 7, 1938.   W. W. CRILEY   2,120,022

FEEDING AND TRANSFER MECHANISM

Filed Sept. 13, 1933   3 Sheets-Sheet 1

William W. Criley, INVENTOR
BY Justin W. Macklin, ATTORNEY

June 7, 1938.   W. W. CRILEY   2,120,022
FEEDING AND TRANSFER MECHANISM
Filed Sept. 13, 1933   3 Sheets-Sheet 2

INVENTOR
William W. Criley,
BY Justin W. Macklin,
ATTORNEY

June 7, 1938. W. W. CRILEY 2,120,022
FEEDING AND TRANSFER MECHANISM
Filed Sept. 13, 1933 3 Sheets-Sheet 3

INVENTOR
William W. Criley,
BY
Justin W. Macklin.
ATTORNEY

Patented June 7, 1938

2,120,022

UNITED STATES PATENT OFFICE 2,120,022

FEEDING AND TRANSFER MECHANISM

William W. Criley, Cleveland, Ohio, assignor to The Ajax Manufacturing Company, Euclid, Ohio, a corporation of Ohio Application September 13, 1933, Serial No. 689,226

17 Claims. (Cl. 10—12)

This invention relates to a feeding and transfer mechanism, and in particular such a mechanism intended for use in connection with forging or upsetting machines used principally in the manufacture of bolts, screw spikes, and the like.

A general object of the invention is to provide a feeding and transfer mechanism, in connection with a heading or forging machine, in which bar stock or the like is fed to cut-off and gripping dies and simultaneously therewith previously acted upon work pieces may be transferred to a subsequent die station by a transfer mechanism, the feeding and transfer operations taking place every stroke of the forging or heading tool.

Another object is to provide a transfer mechanism having mutually pivoted, independently controlled, gripping and carrying transfer fingers, working in timed relation with the action of a heading or forging machine and a stock feeding mechanism, and being adapted to transfer previously acted upon work pieces from one die stage to a subsequent die stage, or stages, simultaneously with and independently of the operation of the bar or stock feeding mechanism.

Another object is to provide an ejector mechanism adapted to eject a finished work piece from a last die stage simultaneously with the feeding of a new work piece to an initial die stage, and also, simultaneously, with the transfer of work pieces between subsequent die stages, each of said operations being accomplished by separately controlled mechanisms acting in timed relation with each other.

Another object is to provide a safety device adapted to cause the work or blank transfer fingers to be swung up and out of the way of the gripping dies or heading tool in the event of accidental clogging or jamming of a work piece in the gripping dies.

Among other and more specific objects are the provision of a feeding and transfer mechanism employing reliable and easily manufactured parts, requiring little or no adjustment from time to time, and adapted to operate effectively over an indefinite period of time. Yet further and more specific objects will be apparent from the following description taken in connection with the attached drawings, in which Fig. 1 is an elevation of one embodiment of a transfer mechanism forming a part of my invention.

Figure 1:
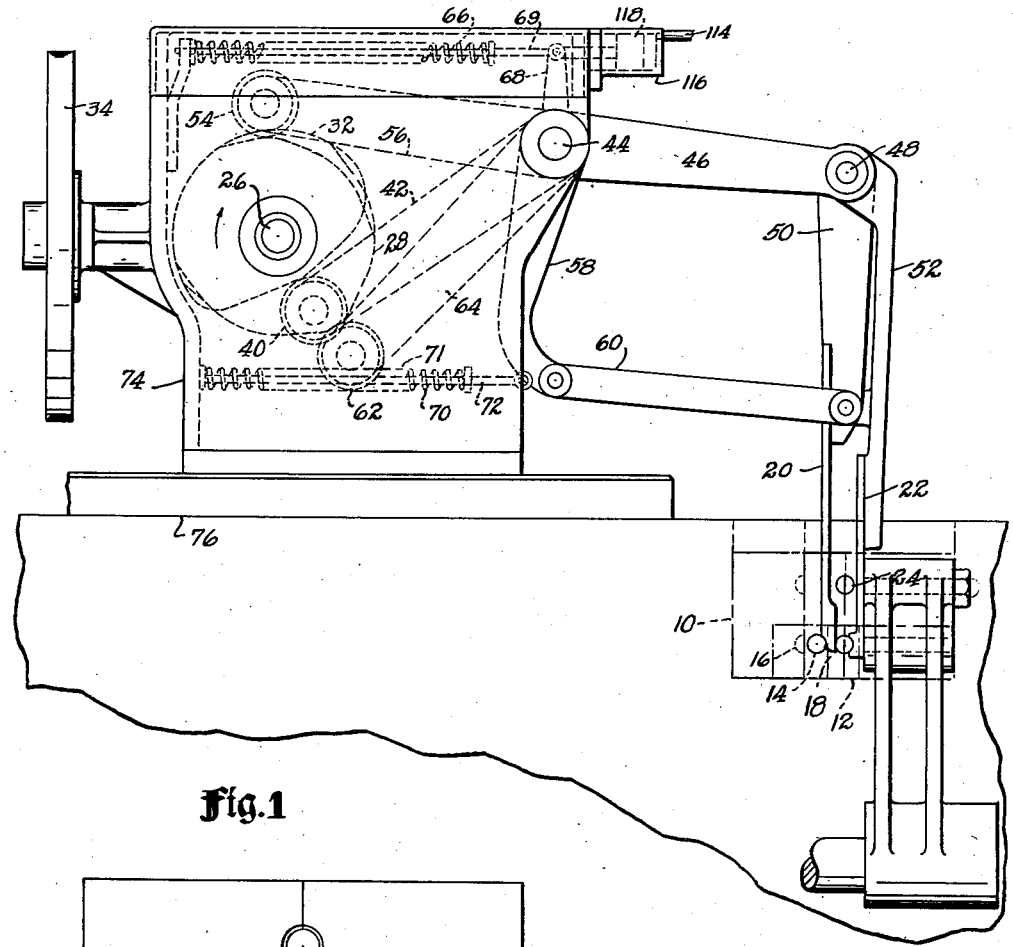
Figure 2:
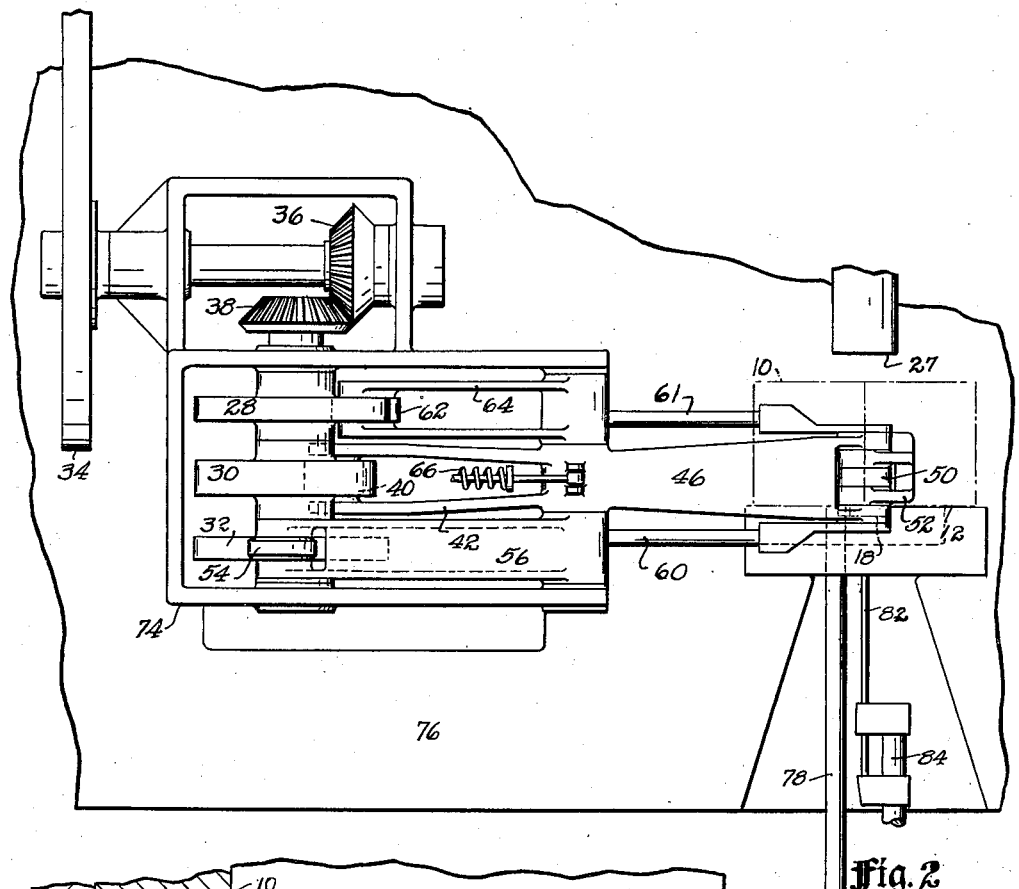
Fig. 2 is a plan view of the same mechanism, including a portion of an ejector mechanism.

Referring now to Figs. 1 and 2, raw stock or work pieces are intermittently fed endwise in between a movable clamping or gripping die 10 and a stationary clamping or gripping die 12 at the point 14, whereupon the movable die 10 moves to the right engaging the work piece in the die cavity 16 and forcing it against a cutting edge of a stationary cutoff die 18, thereby cutting off the piece and carrying it over to a coacting die cavity in the stationary die 12. After a first upsetting or stock gathering operation, the movable die 10 moves to the left and the work or blank gripping and carrying fingers 20 and 22 take hold of the work piece and transfer it sidewise upwardly into the position shown at 24, where it is again gripped by gripping dies for a finishing or final upsetting operation. Thereafter the blank is ejected from the dies as will presently be described.

Considering first the transfer mechanism of Figs. 1 and 2, there is shown a cam supporting shaft 26 having rigidly disposed thereon cams 28, 30 and 32. The shaft 26 may be driven through a sprocket or pulley 34 through beveled gears 36 and 38 as shown. The sprocket or pulley 34 may be connected in any suitable manner to the main actuating shaft of an upsetting or forging machine, so as to drive it, and hence the cams, in timed relation with the movement of a heading ram 27, or other upsetting tool, associated with the main actuating shaft.

The cam 30 controls the vertical motion of the transfer fingers 20 and 22 through action of a roller 40 in the end of a lever 42, this lever being pivoted on a shaft 44 and having an extension arm 46 in the end of which is disposed a pin 48 on which finger carrying arms 50 and 52 are rotatably disposed. The finger carrying arm 50 supports the finger 20, while the finger carrying arm 52 supports the finger 22.

The cam 32 controls the lateral movement of the finger 20 through a roller 54 in the end of a lever 56, which is also pivoted on the shaft 44 and having a downwardly extending arm 58 connecting with the finger supporting arm 50 through a link 60.

In a like manner the cam 28 controls the movement of the finger 22 through a roller 62 on an arm 64, also pivoted on the shaft 44, and which also has a downwardly extending arm 58 and a link 61 connecting it with the finger supporting arm 52.

The roller 40 is held against cam 30 by action of a spring 66 acting upon an auxiliary lever 68 through the pin 69, the auxiliary lever 68 being rigid with the arm 42.

The roller 54 is pressed against the cam 32 by a similar acting spring 70; and in a like fashion the roller 62 is forced against the cam 28 by a tension spring 71, both of these springs being connected to their respective downwardly extending arms 58 through similar pins 72.

The entire cam and lever mechanism may be assembled and supported in any suitable housing, such as that indicated at 74, and may be secured to any convenient part of an upsetting or forging machine 76 as indicated in Figs. 1 and 2.

Figure 4:
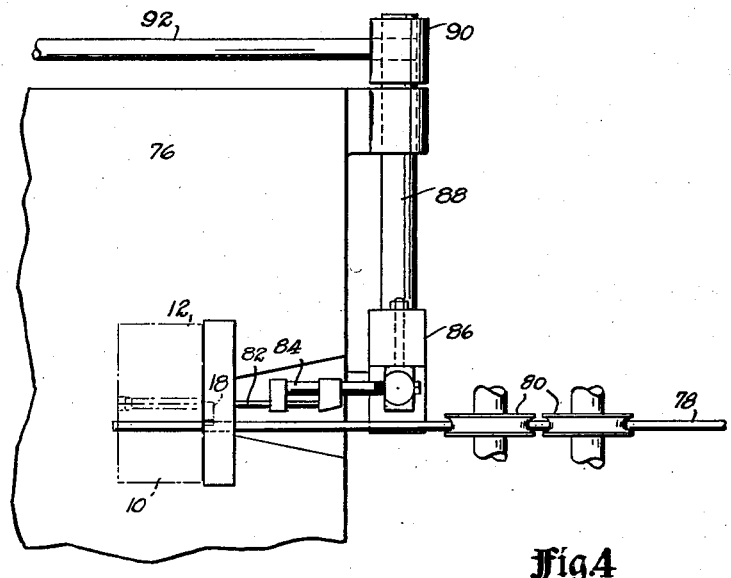
Fig. 4 is a diagrammatic representation of one form of feeding and ejector mechanisms which form a part of my invention.

Referring now to Fig. 4, rod or bar stock 78 may be fed to the clamping or gripper dies 10 and 12 by suitable rollers 80, which may be actuated in any suitable manner, such for example as that shown and described in the patent issued to F. H. Blakeslee, No. 1,260,305. The stock is preferably of rod or bar longer than required to form a work blank and preferably heated just prior to feeding to the clamping or gripper dies.

The stock is first fed endwise through the cut-off die 18 to one side of the normally held upsetting position and cut off to form work pieces by the closing movement of the movable die 10, as heretofore described. It is to be noted that the stock is intermittently fed to a cut-off station remote from the first upsetting station, and is carried to the latter station by the moving die.

The faces of the cams 28, 30 and 32 are adapted to cause the fingers 20 and 22 to grip the work piece after the clamping or gripper dies have closed upon it in its initial or lowermost position, as shown in Fig. 1. Following the opening of the dies after the first upsetting or stock gathering operation, the cams actuate the gripping and carrying fingers 20 and 22 to cause the work piece to be moved sidewise to the left and upwardly and thence to the right into the next adjacent die cavity. Upon the closing of the dies the cams open the fingers and cause them to move downwardly to again grip the newly fed blank and repeat the operation just described.

After the completion of the final or last upsetting or forging operation, the finished article is ejected endwise from the dies by action of the ejector pin 82 (Fig. 4), which is secured to a holding pin 84 rigid with the end of a lever arm 86 secured to a shaft 88, which in turn is oscillated through a lever arm 90 by a rod 92. The rod 92 may be actuated in any manner in timed relation with the rotation of the main shaft of the forging or upsetting machine, as by a cam, and it is not deemed necessary to illustrate this.

The action of the feeding, transfer, and ejecting mechanisms are such that their operations upon work pieces may be simultaneous, that is, a new work piece may be fed to the dies, simultaneously with the transfer of a work piece between die stages and the ejection of a finished work piece from the last die stage. Thus all three operations may take place during one stroke of the heading tool of an upsetting machine.

However, the feeding mechanism may be timed to feed stock to the dies every other stroke of the heading tool; for example, stock may be fed to the lower die of two high cavity dies and the work piece transferred to the upper die and completely finished before fresh stock is again fed to the lower die. By such intermittent feeding it is possible to reverse the order and feed to the top die and then transfer to the lower die for the finishing operation, as the transfer fingers will then not interfere with the feeding. If more than two high cavities are used the feeding to the upper die would of course be every third, fourth, etc., stroke of the heading tool, corresponding to the number of die cavities used. The arrangement is therefore not to be limited to the transfer of blanks or work pieces in one direction.

Figure 3:
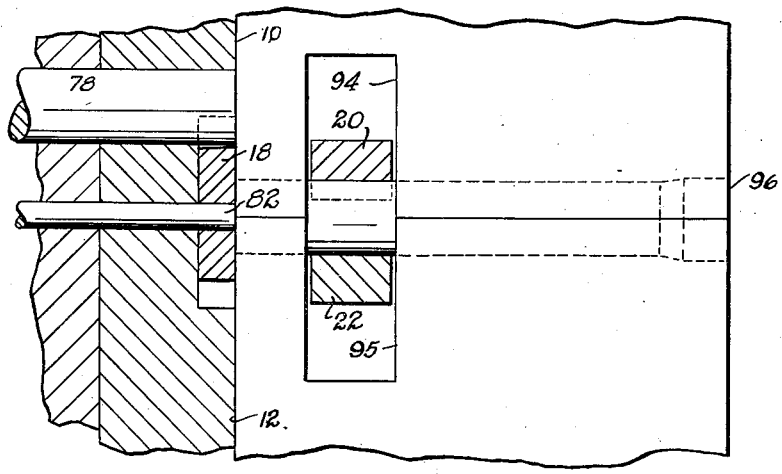
Fig. 3 is a diagrammatic representation of one method in which fingers of the transfer mechanism may pass between clamping dies of a forging or upsetting machine.

In Fig. 3 is illustrated one method in which the fingers 20 and 22 may operate to grip a work piece held in the dies. As there shown the movable die 10 and the stationary die 12 have complementary recesses 94 and 95 in their opposing adjacent faces, large enough to accommodate entry of the fingers 20 and 22 in their closed position. It is to be understood that the action of the transfer mechanism is not to be limited to this specific arrangement but that the fingers 20 and 22 may be so arranged as to grip the blank at any point along its shank.

Figure 5:
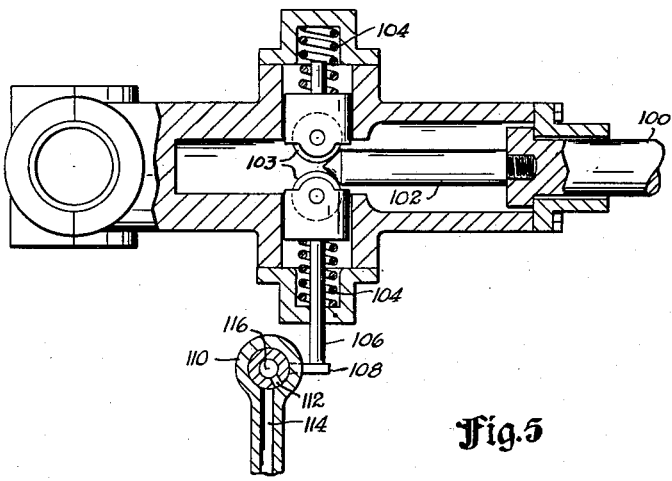
Fig. 5 shows one type of safety mechanism which may form a part of my invention.

In Fig. 5 is shown a mechanism for causing the fingers 20 and 22 to swing up and out of the way of the gripping or clamping dies in case of clogging or jamming of a blank or work piece out of position in between the dies. This mechanism which, is more fully described in the patent to J. R. Blakeslee, No. 648,382, comprises a rod member 100 suitably connected to the actuating elements associated with the moving die 10, so that upon undue resistance to the movement of this die, as during clogging or jamming of a blank between it and the stationary die, pressure is exerted on this rod to force the pin 102 between the rollers 103, causing them to separate against the tension of the springs 104. One of the rollers 103 may have a pin 106 associated therewith adapted to actuate the arm 108 of the valve mechanism 110, to cause registration of the port 112 with the pipe line 114. This may connect this latter line with an air supply (not shown), and thereby deliver air under pressure to a cylinder 117 (see Fig. 1) on the cam and lever housing. The air may actuate a piston 118 in the cylinder to cause the auxiliary lever 68 to move to the left, thereby swinging the fingers 20 and 22 upwardly and clear of the clamping dies.

Figure 6:
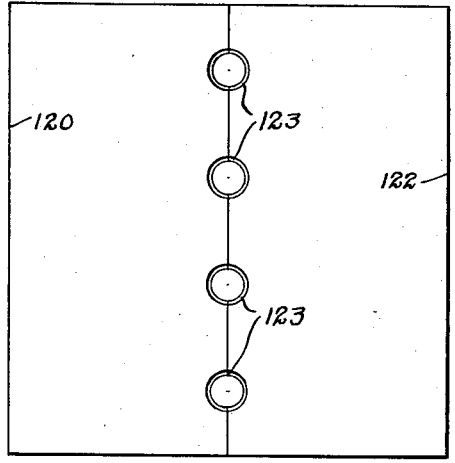
Fig. 6 is a diagrammatic representation of gripping dies having four die stages.

While I have shown the transfer mechanism as adapted to transfer a blank from a roughing die stage to a finishing die stage, it is to be understood that the fingers may be provided with additional notches so as to simultaneously transfer a plurality of blanks from one die stage to another, such for example as between the die stages illustrated diagrammatically in Fig. 6, in which is shown a movable die 120 and stationary die 122 having four die stages 123.

The ejector mechanism described has been shown as ejecting the finished work piece endwise of the dies toward the heading tool. It is to be understood that in lieu of this method of ejecting a work piece, I may also include additional notches in the fingers 20 and 22 so as to carry the finished work piece upwardly a distance equal to that between adjacent die cavities and deliver the work piece to a suitable receiving station, such for example as an inclined plane down which the work piece may roll to a suitable container, or the receiving station may be an additional die cavity of somewhat larger diameter than the other die cavities so as not to grip the blank tightly, and from which the blanks may be pushed by the ejector while the dies are in their closed position.

It will be obvious that other and further detailed modifications may be made in this invention without departing from the spirit and scope of the appended claims, and such is intended to be included therein.

I claim:

1. The combination with relatively movable upsetting dies having a plurality of die stages, of feeding means adapted to feed bar or rod stock endwise to said dies when in their open position, and transfer fingers adapted to grip said stock when said upsetting dies are in their fully closed position and to transfer said stock sidewise from one to another of said die stages when said dies are in their open position.

2. The combination with relatively movable upsetting dies having a plurality of die stages and relatively movable gripping dies, of feeding means adapted to feed bar or rod stock to said dies, means whereby said stock is cut off to form work pieces, and transfer fingers adapted to extend within the limits of the gripping dies and to grip a work piece when said upsetting dies and gripping dies are in their fully closed position concurrently and to transfer said work piece from one to another of said die stages when all of said dies are in their open position.

3. The combination with a pair of gripping dies having complementary recesses therein which constitute blank receiving recesses and having other complementary recesses therein disposed substantially at right angles to the blank receiving recesses, of a blank gripping and carrying fingers normally disposed in said last named recesses, and a safety mechanism for causing removal of said fingers from said recesses on the occurrence of an abnormality in the operation of said dies.

4. The combination with relatively movable upsetting dies having a plurality of die stages, of means for intermittently feeding bar or rod stock to said dies, means whereby said stock is cut off to form work pieces, and transfer fingers adapted to grip a work piece when said upsetting dies are in their fully closed position and to transfer said work piece from one to another of said die stages when said dies are in their open position.

5. The combination with relatively movable upsetting dies having a plurality of work stages, the dies being movable between open and closed positions, of feeding means adapted to feed rod or bar stock to a point remote from said stages, means whereby the stock is cut off to form work pieces, one of said dies being adapted to transfer said work pieces from said remote point to one of said stages, and transfer fingers adapted to grip said stock when the upsetting dies are in their maximum upsetting position and to transfer said stock to another of said die stages when said upsetting dies are in their open position.

6. The combination with gripping dies having a plurality of work stations, of transfer fingers adapted to pass in between said dies from one side thereof, a feeding mechanism adapted to feed work pieces to one of said work stations remote from said side, and means actuating said fingers to transfer said work pieces between said stations toward said side.

7. The combination with relatively movable dies having a plurality of complementary opposed cooperating recesses therein which constitute blank receiving recesses, means for feeding bar or rod stock to one of the blank receiving recesses, means whereby the stock is cut off to form work blanks, transfer fingers supported at a point remote from the recess to which the work blanks are fed, said fingers being movable between spaced points and being adapted to transfer work blanks from one recess to another when the dies are in the open position, the fingers being movable relative to said work blanks when the dies are in the closed position, portions of the fingers adjacent the ends thereof being adapted to grip a blank in the recess to which the blanks are fed when the fingers are at one of said spaced points, said portions of the fingers being adapted to grip a blank in a recess adjacent to the recess to which the blanks are fed when the fingers are moved to the other of said spaced points.

8. The combination with relatively movable dies having a plurality of complementary opposed cooperating recesses therein which constitute blank receiving recesses, means for feeding bar or rod stock to one of the blank receiving recesses, means whereby the stock is cut off to form work blanks, transfer fingers supported at a point remote from the recess to which the work blanks are fed, said fingers being movable between spaced points and being adapted to transfer work blanks from one recess to another when the dies are in the open position, the fingers being movable relative to said work blanks when the dies are in the closed position, portions of the fingers adjacent the ends thereof being adapted to grip a blank in the recess to which the blanks are fed when the fingers are at one of said spaced points, said portions of the fingers being adapted to grip a blank in a recess adjacent to the recess to which the blanks are fed when the fingers are moved to the other of said spaced points, the transfer fingers being substantially at said last named position when work blank material is fed to the dies.

9. The combination with relatively movable dies having a plurality of complementary opposed cooperating recesses therein which constitute blank receiving recesses, means for feeding bar or rod stock to one of the blank receiving recesses, means whereby the stock is cut off to form work blanks when the dies are moved from the open to the closed position, transfer fingers supported at a point remote from the recess to which the work blanks are fed, said fingers being movable between spaced points and being adapted to transfer work blanks from one recess to another when the dies are in the open position, the fingers being movable relative to said work blanks when the dies are in the closed position, portions of the fingers adjacent the ends thereof being adapted to grip a blank in the recess to which the blanks are fed when the fingers are at one of said spaced points, said portions of the fingers being adapted to grip a blank in a recess adjacent to the recess to which the blanks are fed when the fingers are moved to the other of said spaced points.

10. The combination with relatively movable dies having a plurality of complementary opposed cooperating recesses therein which constitute blank receiving recesses, feeding means for feeding bar or rod stock to a point spaced from said blank receiving recesses, means whereby the stock is cut off to form work blanks, means to transfer work blanks from said spaced point to one of the blank receiving recesses, transfer fingers supported at a point remote from the recess to which the blanks are transferred from the cut off means, the transfer fingers being movable between spaced points and being adapted to transfer work blanks from one recess to another, portions of the fingers adjacent the ends thereof being adapted to grip a blank in the recess to which the blanks are fed when the fingers are at one of said spaced points, said portions of the fingers being adapted to grip a blank in an adjacent recess when the fingers are at the other of said spaced points.

11. The combination with relatively movable dies having a plurality of complementary opposed cooperating recesses therein which constitute blank receiving recesses, feeding means for feeding bar or rod stock to a point spaced from said blank receiving recesses, means whereby the stock is cut off to form work blanks, one of said dies being adapted to receive a cut off portion of said stock and transfer it to one of said blank receiving recesses, transfer fingers supported at a point remote from the recess to which the blanks are transferred from the cut off means, the transfer fingers being movable between spaced points and being adapted to transfer work blanks from one recess to another, portions of the fingers adjacent the ends thereof being adapted to grip a blank in the recess to which the blanks are fed when the fingers are at one of said spaced points, said portions of the fingers being adapted to grip a blank in an adjacent recess when the fingers are at the other of said spaced points.

12. The combination with a pair of dies having a plurality of die stages, said dies being relatively movable toward and away from each other to closed and open position, respectively, means for feeding bar or rod stock to one stage of the dies, transfer fingers adapted to transfer said blanks from said one of the die stages to another, and operative in the path of the dies, of mechanism operative to move the fingers clear of the dies consequent upon the occurrence of an abnormality in the operation of the dies.

13. The combination with a clamping die having a plurality of die stages and cooperating heading tools for said stages, said clamping die and said heading tools being relatively movable toward and away from each other to closed and open position, respectively, and said clamping die having portions movable toward and away from each other, means for feeding bar or rod stock to one stage of the clamping die, transfer fingers operative between the portions of the clamping die to grip and transfer said blanks from said one of the die stages to another, of mechanism operative to move the fingers clear from the portions of the clamping die consequent upon occurrence of an abnormality in the operation of the clamping die.

14. In a forging machine, a relatively movable heading tool and die, said die being a clamping die and comprising separable portions having cavities in their adjacent faces defining a plurality of blank forming recesses when the portions are closed and being cooperable with the heading tool, auxiliary recesses in the adjacent faces of the separable clamping die portions and opening into said forming recesses, transfer fingers operative in said auxiliary recesses for gripping a blank while the blank is in one of the forming recesses and while the separable clamping die portions are in closed position, and means for operating said fingers in said auxiliary recesses for transferring the gripped blank by the fingers from one of said forming recesses to another when the separable die portions are in open position.

15. In a forging machine, a movable heading tool, a clamping die, said clamping die comprising relatively separable portions having cavities in their adjacent faces defining blank forming recesses when the portions are together, said blank forming recesses lying substantially in a common plane, auxiliary recesses in the said adjacent faces of said die portions and extending generally parallel to said plane and opening into the forming recesses at opposite sides thereof, cooperating transfer fingers movable longitudinally of the auxiliary recesses and movable relatively toward and away from each other transversely of the plane of the forming recesses for gripping a blank in a forming recess and transferring said blank to another forming recess, means operatively associated with said fingers for effecting gripping engagement thereof with said blank when the clamping die portions are in closed position and for moving the fingers parallel to the plane of the forming recesses while concurrently constraining said fingers to gripping relation when the die portions are relatively separated for transferring the blank to a different one of said forming recesses.

16. In a forging machine, a movable heading tool, a clamping die, said clamping die comprising relatively separable portions having cavities in their adjacent faces defining blank forming recesses when the portions are together, auxiliary recesses in the said adjacent faces of said die portions and opening into the forming recesses at opposite sides thereof, cooperating transfer fingers movable along the auxiliary recesses and movable relatively toward and away from each other transversely of the auxiliary recesses for gripping a blank in a forming recess and transferring said blank to another forming recess, each of said forming recesses having a forming portion, and said auxiliary recesses being spaced from said forming portions, means operatively associated with said fingers for effecting gripping engagement thereof with the blank and for moving the fingers when the die portions are relatively separated for transferring the gripped blank to a different one of said forming recesses.

17. In a forging machine, a movable heading tool, a clamping die, said clamping die comprising relatively separable portions having cavities in their adjacent faces defining blank forming recesses when the portions are together, auxiliary recesses in the said adjacent faces of said die portions and opening into the forming recesses at opposite sides thereof, cooperating transfer fingers in the auxiliary recesses and movable for gripping a blank in a forming recess and transferring said blank to another forming recess, means operatively associated with said fingers for effecting gripping engagement thereof with the blank when the separable clamping die portions are in closed position and for moving the fingers when the die portions are relatively separated for transferring the blank to a different one of said forming recesses, and said forming recesses having forming portions, respectively, and said auxiliary recesses being spaced beyond said forming portions in a direction away from the cooperating heading tool.

WILLIAM W. CRILEY.